United States Patent
Gieras

(10) Patent No.: US 9,859,776 B2
(45) Date of Patent: Jan. 2, 2018

(54) STARTING CURRENT REDUCTION IN INDUCTION MOTORS

(71) Applicant: Hamilton Sundstrand Corporation, Charlotte, NC (US)

(72) Inventor: Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 308 days.

(21) Appl. No.: 14/861,510

(22) Filed: Sep. 22, 2015

(65) Prior Publication Data

US 2017/0085161 A1    Mar. 23, 2017

(51) Int. Cl.
*H02K 17/16* (2006.01)
*H02K 17/30* (2006.01)

(52) U.S. Cl.
CPC .......... *H02K 17/165* (2013.01); *H02K 17/30* (2013.01)

(58) Field of Classification Search
CPC ............................. H02K 17/165; H02K 17/30
See application file for complete search history.

(56) References Cited

U.S. PATENT DOCUMENTS

| | | | |
|---|---|---|---|
| 4,309,635 A | 1/1982 | Sei et al. | |
| 4,393,344 A | 7/1983 | Whellams | |
| 4,445,081 A * | 4/1984 | Kalman | H02K 17/36 318/737 |
| 4,473,752 A | 9/1984 | Cronin | |
| 4,761,703 A | 8/1988 | Kliman et al. | |
| 4,920,293 A | 4/1990 | Kanda | |
| 5,304,877 A * | 4/1994 | Baek | H02K 5/12 310/211 |
| 5,587,643 A * | 12/1996 | Heller | H02P 9/46 318/821 |
| 6,163,137 A | 12/2000 | Wallace et al. | |
| 7,129,613 B2 | 10/2006 | Nishihama et al. | |
| 2009/0033170 A1* | 2/2009 | Jakobi | H02K 17/165 310/156.79 |
| 2017/0085161 A1* | 3/2017 | Gieras | H02K 17/165 |

FOREIGN PATENT DOCUMENTS

JP       2006158018 A       6/2006

* cited by examiner

*Primary Examiner* — Robert W Horn
(74) *Attorney, Agent, or Firm* — Kinney & Lange, P.A.

(57) ABSTRACT

A rotor of an induction motor includes a shaft, a ferromagnetic rotor core, first and second inductors axially bracketing the rotor core, and a rotor cage. The shaft extends along a stator axis, and the rotor core is disposed coaxially about the shaft. The rotor cage comprises first and second supports, and a plurality of cage bars. The supports are disposed axially between the rotor core and the first and second inductors, respectively. The cage bars surround the shaft, pass through the rotor core, are secured at the first and second supports, and are each electrically connected to both the first and second inductors.

14 Claims, 4 Drawing Sheets

STARTING CURRENT REDUCTION IN INDUCTION MOTORS

BACKGROUND

The present invention relates generally to induction motors, and more particularly to a method and apparatus to reduce starting currents in a cage induction motor.

Induction motors are used in a wide variety of consumer and industrial applications, and generate rotor torque via stator currents that magnetic fields rotating at a synchronous speed $n_s$. These changing magnetic fields induce opposing rotor currents according to Lenz's law, and drive rotors to an operating rotor speed $n<n_s$. The difference between synchronous speed $n_s$ and rotor speed $n$ is characterized by slip s, where:

$$s = \frac{n_s - n}{n_s} \quad \text{[Equation 1]}$$

During normal sustained operation, slip is low (e.g. s=~0.05), and stator current is not significantly affected by slip. At the beginning of motor startup, however, slip is high (s=1 when stationary, and close to 1 immediately thereafter), and can cause dramatic increases in stator current over optimal operating levels. In some cases, stator currents during startup can be 5-10 times greater than corresponding currents during sustained operation. High startup currents are particularly problematic in large motors, where excessive currents can damage motor components or otherwise reduce part lifetimes. A variety of methods are commonly used to reduce stator current during startup, mostly through the use of peripheral power electronics such as solid state soft starters, Some methods include Y-Delta switches, skin effects produced by deep-bar or double-cage rotors, and autotransformers. In general, many induction motors include some sort of system or device to reduce starting rotor currents to non-damaging levels.

SUMMARY

The present disclosure is directed toward a rotor of an induction motor. The rotor includes a shaft, a ferromagnetic rotor core, first and second inductors axially bracketing the rotor core, and a rotor cage. The shaft extends along a stator axis, and the rotor core is disposed coaxially about the shaft. The rotor cage comprises first and second supports, and a plurality of cage bars. The supports are disposed axially between the rotor core and the first and second inductors, respectively. The cage bars surround the shaft, pass through the rotor core, are secured at the first and second supports, and are each electrically connected to both the first and second inductors.

The present summary is provided only by way of example, and not limitation. Other aspects of the present disclosure will be appreciated in view of the entirety of the present disclosure, including the entire text, claims, and accompanying figures.

Figure 1:
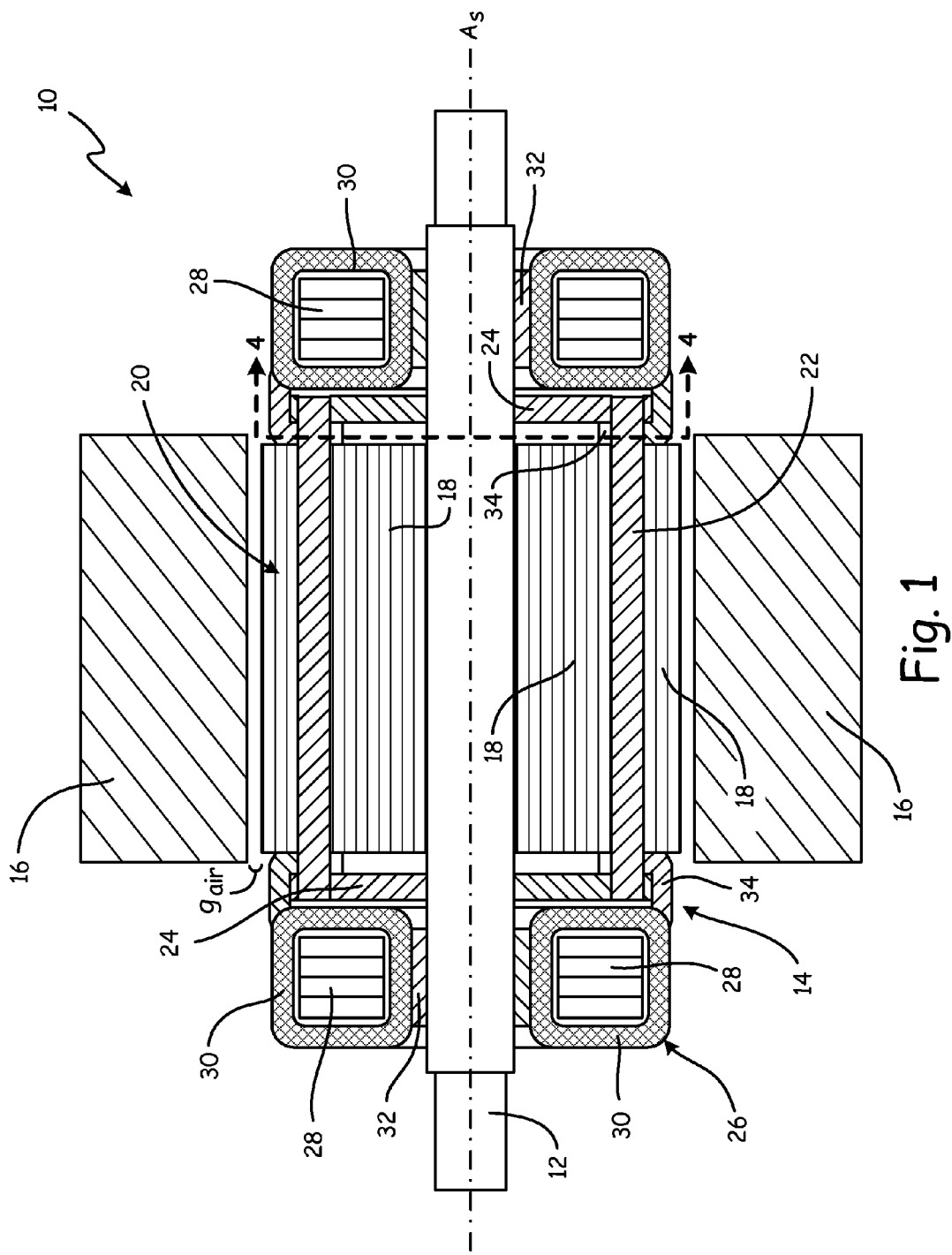
FIG. 1 is a cross-sectional view of an induction motor including a cage rotor and two inductors.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present application discloses a rotor for an induction motor. This rotor includes a rotor cage having bars that pass axially through a rotor core, and are electrically connected at axially outer ends of the rotor to respective inductors. The additional inductance provided by the rotor inductors increases rotor reactance during high-slip conditions, reducing rotor current referred to the stator during starting.

FIG. 1 is a cross-sectional view of induction motor 10, shaft 12, rotor 14, and stator 16. Rotor 14 includes rotor core 18, rotor cage 20 (with cage bars 22 and cage supports 24), and inductors 26 (with inductor core 28, inductor windings 30, inductor supports 32, and inductor terminal 34). Rotor 14 and stator 16 are separated by air gap $g_{air}$.

Shaft 12 is oriented along shaft axis $A_s$, and carries rotor 14. Rotor 14 includes rotor core 18, rotor cage 20, and inductor 26. Rotor core 18 is an annular ferromagnetic block disposed about shaft 12. Rotor core 18 can, for example, be a laminated or sintered ferromagnetic stack. Cage bars 22 are conductive bars that pass axially or substantially axially through rotor core 18, and are distributed circumferentially about shaft axis $A_s$. Cage bars 22 are positioned and supported by cage supports 24, which can for example be electrically insulating disks, plates, or rings that axially bracket rotor core 18. Cage bars 22 and cage supports 24 are described in greater detail below with respect to FIG. 3. Rotor core 18 can have any number of cage bars 22. In some examples, for instance, rotor core 18 can have 16 cage bars 22 arranged in groups of two.

Stator 16 is an annular structure with a plurality of distinct poles formed, e.g., by stator windings or additively manufactured conductive stator structures. Alternating current through poles of stator 16 induces voltage across cage bars 22 of rotor 14. Cage bars 22 are received at both axial ends at inductor terminals 34 of inductors 26. Inductors 26 include inductor windings 30 surrounding inductor cores 28. Inductor cores 28 are annular ferromagnetic rings disposed about shaft 12, and can, for example, be laminated or sintered stacks. Inductor windings 30 are separate sets of conductive windings wrapped or formed about inductor cores 28, and electrically connected to cage bars 22 via inductor terminals 34. Inductors 26 have total inductance $L_I$, and are described in greater detail with respect to FIGS. 2 and 4, below. Inductor windings 30 form the sole electrical connection between circumferentially adjacent cage bars 22 of rotor cage 20.

Induction motor 10 is an asynchronous torque motor wherein AC current through stator 16 produces a magnetic field rotating about shaft axis $A_s$ at synchronous speed $n_s$. This changing magnetic field induces opposing currents along cage bars 22 of rotor 14 according to Lenz's law, and causes rotor 14 to rotate on shaft 12 at rotor speed n<$n_s$. During ordinary operating conditions rotor speed n may, for example, be 1-5% less than synchronous speed $n_s$. The difference between synchronous and rotor speeds during operation of induction motor 10 is characterized by slip s, which is high during motor startup periods, before rotor 14 is rotating at full speed. Slip can, for example, decrease during startup from s=1 (i.e. a stationary rotor) to s=0.05 or less.

Stator current $I_1=I_0+I_2'$, where $I_0$ is the no-load stator current, and $I_2'$ is rotor current referred to the stator. In general:

$$I_2' = \frac{sE_1}{R_2' + jsX_{total}'} = \frac{E_1}{\frac{R_2'}{s} + jX_{total}'} \quad \text{[Equation 2]}$$

where $E_1$ is back EMF, $R_2'$ is rotor resistance referred to the stator, and $X'_{total}$ is total reactance referred to the stator. Consequently, referred rotor current $I_2'$ is greatest when slip s is large (i.e. close to 1), resulting in large stator currents $I_1$ during startup. Total reactance $X_{total}$ is characterized as:

$$X_{total}=X_2+2\pi s f L_I=2\pi s f(L_{cage}+L_I) \quad \text{[Equation 3]}$$

where $X_2$ is rotor cage reluctance, f is the rotor current frequency, $L_{cage}$ is the winding inductance of rotor cage 20, and $L_I$ is the total additional inductance provided by inductors 26. Reactance $X_{total}$ is high when s is large (i.e. close to 1), e.g. during motor startup, and correspondingly low when slip is small (i.e. close to 0), e.g. during sustained motor operation. Consequently, total reactance $X_{total}$ opposes the effect of slip on referred rotor current $I_2$, mitigating the tendency of $I_2$ to increase as slip s decreases. $L_I$ can be configured by altering, e.g., the number of turns in each inductor winding 30, so as to substantially counteract referred rotor current increases at low slip s, during startup. Alternatively, $L_I$ can be selected to ensure that a maximum starting stator current (i.e. for s=1) will not exceed a threshold value selected to prevent damage to motor components.

Inductors 26 interface with rotor cage 20 via inductor terminals 34. Inductor terminals 34 extend axially inward past cage supports 24, and hook radially inward to a position between rotor core 18 and cage support 24. Inductor terminals 34 receive cage bars 22 in corresponding slots or holes, as described in greater detail below with respect to FIG. 3.

Figure 2:
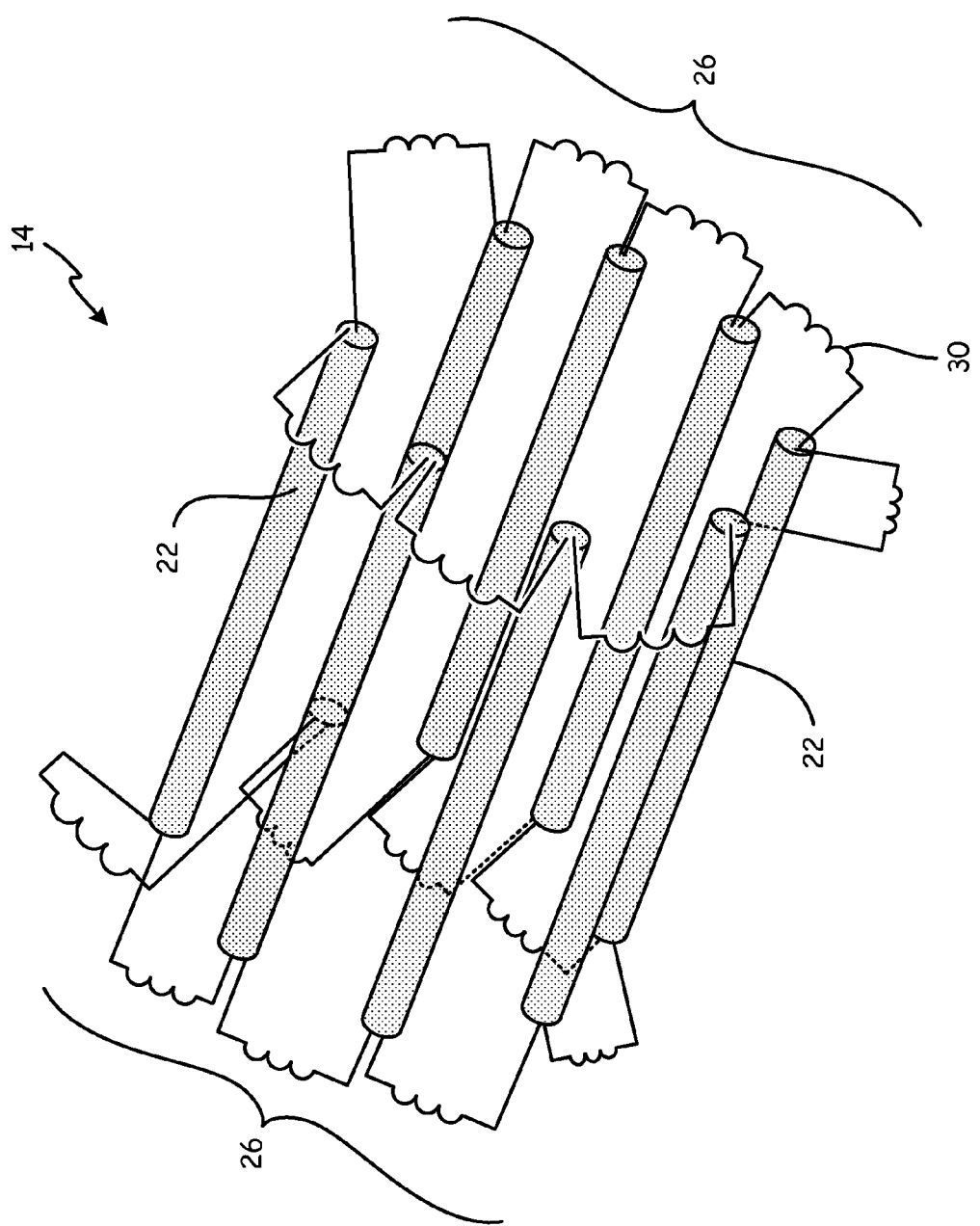
FIG. 2 is a schematic view of the rotor of the induction motor of FIG. 1.

FIG. 2 is a schematic view of rotor 14, illustrating rotor bars 22 and inductors 26. In the depicted embodiment, each rotor bar 18 is electrically connected to adjacent rotor bars 18 exclusively via windings 30 of inductors 26, at either axial end of rotor bars 18. Rotor bars 18 are otherwise electrically isolated from each other.

Figure 3:
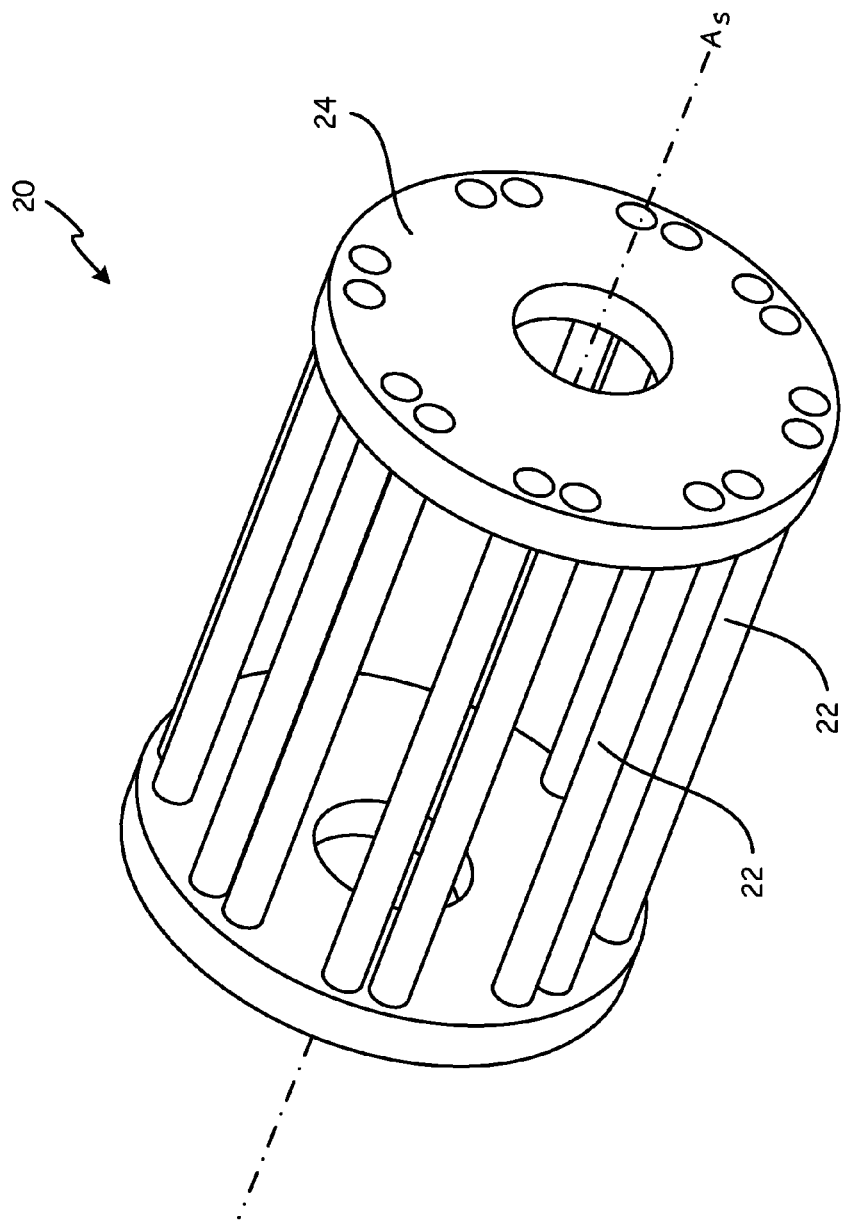
FIG. 3 is a perspective view of the cage rotor of FIG. 1, shown in isolation.

FIG. 3 is a perspective view of rotor cage 20 in isolation, illustrating cage bars 22 and cage supports 24. Cage supports 24 can be annular disks, rings, or plates extending radially from a central location abutting shaft 12 (see FIG. 1), out past the radial location of cage bars 22. Cage bars are circumferentially distributed about shaft axis $A_s$, and extend axially or substantially axially from one cage support 24 to the other. All cage bars 22 are anchored to both cage supports 24. Cage bars 22 are conductive posts formed, e.g., of copper. Unlike rings of conventional rotor cages, cage supports 24 are non-conductive. Cage supports 24 can, for example, be formed of an electrically insulating ceramic or polymer. Cage supports 24 retain and position cage bars 22, while ensuring that the only electrical paths between cage bars 22 are through inductors 26. Inductor terminals 34 are electrically connected to inductor windings 30. In some embodiments, inductor terminals can, for example, be soldered or clamped to inductor windings 30.

Figure 4:
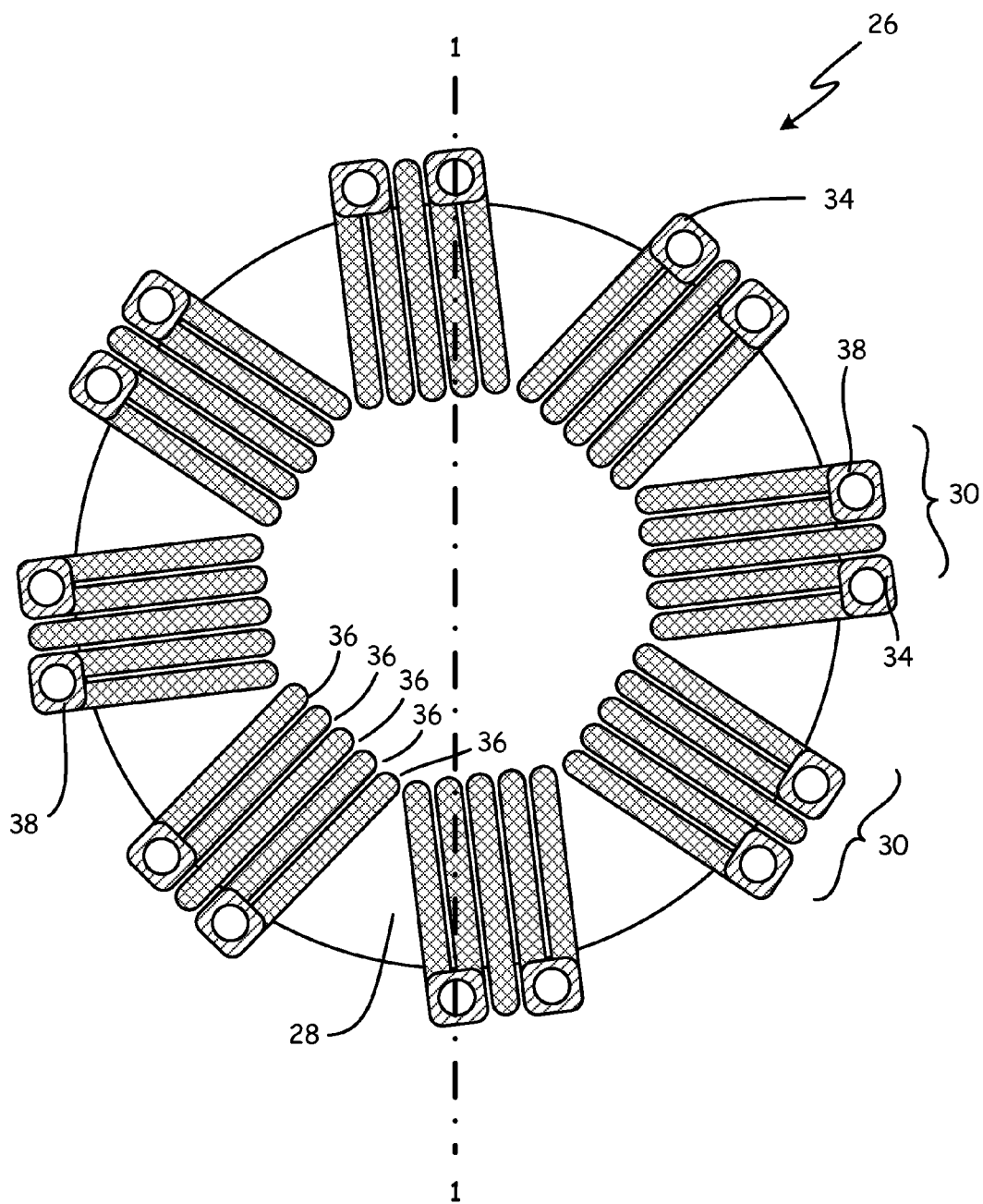
FIG. 4 is a side view of an inductor of integrated system of FIG. 1.

FIG. 4 is a simplified side view of one inductor 26, taken from section line 3-3 of FIG. 1. As described previously, each inductor 26 includes a plurality of inductor windings 30 disposed about inductor core 28. Each inductor winding 30 is formed of a plurality of turns 36, and inductor windings 30 form the sole electrical path between adjacent cage bars 22, which are received at terminal holes 38 of inductor terminals 34. As illustrated in FIG. 1, inductor terminals 34 have a hooked shape that extends radially over and axially past cage supports 24. Terminal holes 38 are formed on this hooked region of inductor terminals 34, and are sized and shaped to snugly receive cage bars 22. In the embodiments depicted in FIGS. 1-3 of present disclosure, inductors 26 need not structurally support cage bars 22, which are retained and supported by cage supports 24. In alternative embodiments, however, cage supports 24 can be reduced or removed, such that inductors 26 bear the mechanical load of rotor cage 20.

Inductors 26 increase the inductance, and accordingly the reactance, of rotor 14 of induction motor 10 in high-slip conditions such as during startup. This conditional increase in reactance opposes the tendency for referred rotor current to drive up stator currents during high-slip conditions. In this way, the present invention provides a simple, compact mechanism to reliably reduce startup currents without need for peripheral power electronics. Inductors 26 can, for example, ensure that rotor current varies by no more than 50% as a function of slip s.

DISCUSSION OF POSSIBLE EMBODIMENTS

The following are non-exclusive descriptions of possible embodiments of the present invention.

A rotor of an induction motor, the stator core comprising: a shaft extending along a stator axis; a ferromagnetic rotor core disposed coaxially about the shaft; first and second inductors axially bracketing the ferromagnetic rotor core; and a rotor cage comprising: first and second supports disposed axially between the ferromagnetic rotor core and the first and second inductors, respectively; and a plurality of cage bars surrounding the shaft, passing through the ferromagnetic rotor core, secured at the first and second supports, and electrically connected to both the first and second inductors.

The rotor of the preceding paragraph can optionally include, additionally and/or alternatively, any one or more of the following features, configurations and/or additional components:

A further embodiment of the foregoing rotor, wherein the first and second supports are formed of non-conducting material.

A further embodiment of the foregoing rotor, wherein the ferromagnetic rotor core comprises an axial stack of ferromagnetic plates bracketed by the first and second supports.

A further embodiment of the foregoing rotor, wherein the first and second inductors each comprise: an annular ferromagnetic inductor core coaxial with and disposed about the shaft; and a plurality of electrically separate coils of inductor windings disposed about the annular core.

A further embodiment of the foregoing rotor, wherein each cage bar mates with one and only one of the electrically separate coils of inductor windings of each inductor.

A further embodiment of the foregoing rotor, wherein the first and second inductors are supported and spaced away from the shaft by electrically insulating bushings.

A further embodiment of the foregoing rotor, wherein the first and second inductors each further comprise axially inward-facing terminals, and wherein each of the axially-extending cage bars mates with one of the axially inward-facing terminals of each of the first and second inductors.

A further embodiment of the foregoing rotor, wherein the inward-facing terminals include terminal holes disposed to receive the cage bars.

A further embodiment of the foregoing rotor, wherein each of the inward facing terminals extends axially inward and radially outward past the supports, towards the ferromagnetic rotor core, and radially inward in a lip about the supports, such that the lips of the inward-facing terminal include the terminal holes and receive the cage bars.

An induction motor comprising: a shaft disposed along a motor axis; an annular stator having a plurality of stator windings surrounding but mechanically isolated from the shaft; an annular rotor mounted on and surrounding the shaft, and radially separated from the annular stator by an air gap, the annular rotor comprising: a ferromagnetic rotor core disposed coaxially about the shaft; first and second inductors axially bracketing the ferromagnetic rotor core; first and second supports disposed axially between the ferromagnetic rotor core and the first and second inductors, respectively; and a plurality of axially-extending cage bars surrounding the shaft, passing through the ferromagnetic rotor core, secured at the first and second supports, and electrically connected to both the first and second inductors.

The induction motor of the preceding paragraph can optionally include, additionally and/or alternatively, any one or more of the following features, configurations and/or additional components:

A further embodiment of the foregoing induction motor, wherein the annular stator is disposed radially outward of the annular rotor.

A further embodiment of the foregoing induction motor, wherein the ferromagnetic rotor core extends radially from an circumferential air gap surface adjacent the air gap to a second circumferential surface, and wherein the plurality of axially extending cage bars pass through the ferromagnetic core at a radial location closer to the circumferential air gap surface than the second circumferential surface.

A further embodiment of the foregoing induction motor, wherein the first and second inductors each include terminals that hook radially around and axially inward past the first and second supports to receive the cage bars.

A further embodiment of the foregoing induction motor, wherein the first and second inductors have inductance tuned to produce rotor reluctance in the annular rotor such that rotor current referred to the stator varies by no more than 50% as a function of slip.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor of an induction motor, the stator core comprising:
   a shaft extending along a stator axis;
   a ferromagnetic rotor core disposed coaxially about the shaft;
   first and second inductors axially bracketing the ferromagnetic rotor core; and
   a rotor cage comprising:
      first and second supports disposed axially between the ferromagnetic rotor core and the first and second inductors, respectively; and
      a plurality of cage bars surrounding the shaft, passing through the ferromagnetic rotor core, secured at the first and second supports, and electrically connected to both the first and second inductors.

2. The rotor of claim 1, wherein the first and second supports are formed of non-conducting material.

3. The rotor of claim 1, wherein the ferromagnetic rotor core comprises an axial stack of ferromagnetic plates bracketed by the first and second supports.

4. The rotor of claim 1, wherein the first and second inductors each comprise:
   an annular ferromagnetic inductor core coaxial with and disposed about the shaft; and
   a plurality of electrically separate coils of inductor windings disposed about the annular core.

5. The rotor of claim 4, wherein each cage bar mates with one and only one of the electrically separate coils of inductor windings of each inductor.

6. The rotor of claim 4, wherein the first and second inductors are supported and spaced away from the shaft by electrically insulating bushings.

7. The rotor of claim 4, wherein the first and second inductors each further comprise axially inward-facing terminals, and wherein each of the axially-extending cage bars mates with one of the axially inward-facing terminals of each of the first and second inductors.

8. The rotor of claim 7, wherein the inward-facing terminals include terminal holes disposed to receive the cage bars.

9. The rotor of claim 8, wherein each of the inward facing terminals extends axially inward and radially outward past the supports, towards the ferromagnetic rotor core, and radially inward in a lip about the supports, such that the lips of the inward-facing terminal include the terminal holes and receive the cage bars.

10. An induction motor comprising:
    a shaft disposed along a motor axis;
    an annular stator having a plurality of stator windings surrounding but mechanically isolated from the shaft;

an annular rotor mounted on and surrounding the shaft, and radially separated from the annular stator by an air gap, the annular rotor comprising:
- a ferromagnetic rotor core disposed coaxially about the shaft;
- first and second inductors axially bracketing the ferromagnetic rotor core; and
- first and second supports disposed axially between the ferromagnetic rotor core and the first and second inductors, respectively; and
- a plurality of axially-extending cage bars surrounding the shaft, passing through the ferromagnetic rotor core, secured at the first and second supports, and electrically connected to both the first and second inductors.

11. The induction motor of claim 10, wherein the annular stator is disposed radially outward of the annular rotor.

12. The induction motor of claim 10, wherein the ferromagnetic rotor core extends radially from an circumferential air gap surface adjacent the air gap to a second circumferential surface, and wherein the plurality of axially extending cage bars pass through the ferromagnetic core at a radial location closer to the circumferential air gap surface than the second circumferential surface.

13. The induction motor of claim 10, wherein the first and second inductors each include terminals that hook radially around and axially inward past the first and second supports to receive the cage bars.

14. The induction motor of claim 10, wherein the first and second inductors have inductance tuned to produce rotor reluctance in the annular rotor such that rotor current referred to the stator varies by no more than 50% as a function of slip.

* * * * *